United States Patent [19]
Sato et al.

[11] Patent Number: 6,024,674
[45] Date of Patent: Feb. 15, 2000

[54] FRICTIONAL ENGAGING CLUTCH CONTROL SYSTEM FOR AUTOMATIC VEHICLE TRANSMISSION

[75] Inventors: Kazumi Sato; Kazuomi Kiku; Akio Fujii; Tomoharu Kumagai; Hiroyuki Abe, all of Wako, Japan

[73] Assignee: Honda Giken Kogyo Kabushiki Kaisha, Tokyo, Japan

[21] Appl. No.: 08/979,963

[22] Filed: Nov. 26, 1997

[30] Foreign Application Priority Data

Nov. 28, 1996 [JP] Japan ................................ 8-332731

[51] Int. Cl.$^7$ .......................................... F16H 9/00
[52] U.S. Cl. .......................... 477/175; 477/174; 477/181; 477/102
[58] Field of Search ..................... 477/174, 175, 477/176, 181, 180, 102; 475/116, 118, 119

[56] References Cited

U.S. PATENT DOCUMENTS

| | | | |
|---|---|---|---|
| 5,213,186 | 5/1993 | Murata | 477/174 X |
| 5,226,513 | 7/1993 | Shibayama | 477/169 |
| 5,347,885 | 9/1994 | Taga et al. | 477/65 |
| 5,425,687 | 6/1995 | Taga et al. | 477/174 X |
| 5,611,752 | 3/1997 | Kamada et al. | 477/174 X |
| 5,620,390 | 4/1997 | Kono et al. | 477/169 X |
| 5,643,136 | 7/1997 | Kono et al. | 477/174 X |

FOREIGN PATENT DOCUMENTS

| | | |
|---|---|---|
| 6-288449 | 10/1994 | Japan . |
| 7-42768 | 2/1995 | Japan . |
| 8-291861 | 11/1996 | Japan . |

*Primary Examiner*—Dirk Wright
*Assistant Examiner*—Peter T. Kwon
*Attorney, Agent, or Firm*—Armstrong, Westerman, Hattori, McLeland & Naughton

[57] ABSTRACT

A frictional engaging clutch for an automatic vehicle transmission which discriminates judder which has occurred on the vehicle and controls to decrease the same. A clutch slip ratio is calculated, the calculated ratio is then converted into an ac waveform which is filtered by filters similar to a judder filter and a disturbance filter to extract frequency components of an appropriate range, and the number of times (NTEX) at which the filtered waveform peaks exceeds threshold values (appropriately set) is counted, and based on the counts, the judder is discriminated or determined. The configuration is simple and makes it possible to discriminate judder in an automatic vehicle transmission.

19 Claims, 17 Drawing Sheets

FRICTIONAL ENGAGING CLUTCH CONTROL SYSTEM FOR AUTOMATIC VEHICLE TRANSMISSION

BACKGROUND OF THE INVENTION

1. Field of the Invention

This invention relates to a frictional engaging clutch control system for an automatic vehicle transmission, more specifically to an improved system for detecting a judder that may occur on the vehicle, and acts to decrease the same.

2. Description of the Related Art

There is sometimes a vibrational disturbance on a vehicle when running on a bumpy road due to the unevenness of the road surface. Similarly, a vibration often called "judder" (self-excited vibration) may occur, which is a kind of self-excited vibration due to control hunting while slip-engaging a frictional engaging clutch such as a start clutch, a torque converter lock-up clutch of the continuously variable type or multi-step transmission. Since such a judder degrades vehicle driving comfort, a vibration should preferably be discriminated or determined whether it is a vibrational disturbance caused by a reason outside of the vehicle such as the rough road surface on which the vehicle is traveling, or it is a judder, and to decrease or suppress the same if it is.

For that purpose, Japanese Laid-Open Patent Application No. Hei 7 (1995)-42,768 proposes to discriminate the occurrence of judder based on rotational speed fluctuations between driven wheels and free wheels of the vehicle. Specifically, the prior art system is based on the vehicle having a chain-transmission mechanism for 4WD which can attenuate the judder occurred on free wheels. Accordingly, the system is configured to discriminate the occurrence of judder from a deviation between the rotational speed fluctuations of the driven wheels and free wheels of the vehicle.

More specifically, the prior art system is configured to determine that a vibration is a judder when the rotational speed fluctuation occurs only on driven wheels, while determining a vibration as a vibrational disturbance when the rotational speed fluctuation occurs both the driven wheels and free wheels. The prior art system changes the lock-up clutch slippage control to decrease or suppress the judder when the vibration is discriminated as being a judder.

However, the prior art system requires to detect both the rotational speed fluctuations of the driven and free wheels, and is disadvantageously complicated in configuration.

SUMMARY OF THE INVENTION

An object of this invention is therefore to overcome the drawback of the prior art and to provide a frictional engaging clutch control system for an automatic vehicle transmission, which enables to discriminate or determine the occurrence of judder with a simple configuration.

Moreover, the prior art system is based on a transmission having the chain-transmission mechanism for 4WD and hence, is not applicable to other type of transmission.

Another object of this invention is to provide a frictional engaging clutch control system for an automatic vehicle transmission, which enables to discriminate or determine the occurrence of judder in a transmission without such a chain-transmission mechanism.

This invention achieves this object by providing a system for controlling a frictional engaging clutch installed in a transmission which transmits output torque generated by an internal combustion engine mounted on a vehicle to wheels of the vehicle, including judder discriminating means for discriminating whether a vibration which has occurred on the vehicle is a judder; and judder-decreasing control means for acting to decrease the judder when the judder discriminating means discriminates that the vibration which has occurred on the vehicle is a judder. In the system, the judder discriminating means includes frictional engaging clutch rotational speed fluctuation detecting means for detecting an output rotational speed fluctuation of the frictional engaging clutch; first filter means for transmitting a first range of frequency component of the detected output rotational speed fluctuation of the frictional engaging clutch; first threshold setting means for setting a first threshold; first counting means for comparing the first range of frequency component (filtered) with the first threshold to count the number of times (NTEX) at which the first range of frequency component exceeds the first threshold; and judder determining means for determining that the vibration which has occurred on the vehicle is a judder when the counted number exceeds a reference value.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

Embodiments of the invention will now be explained with reference to the attached drawings.

Figure 1:
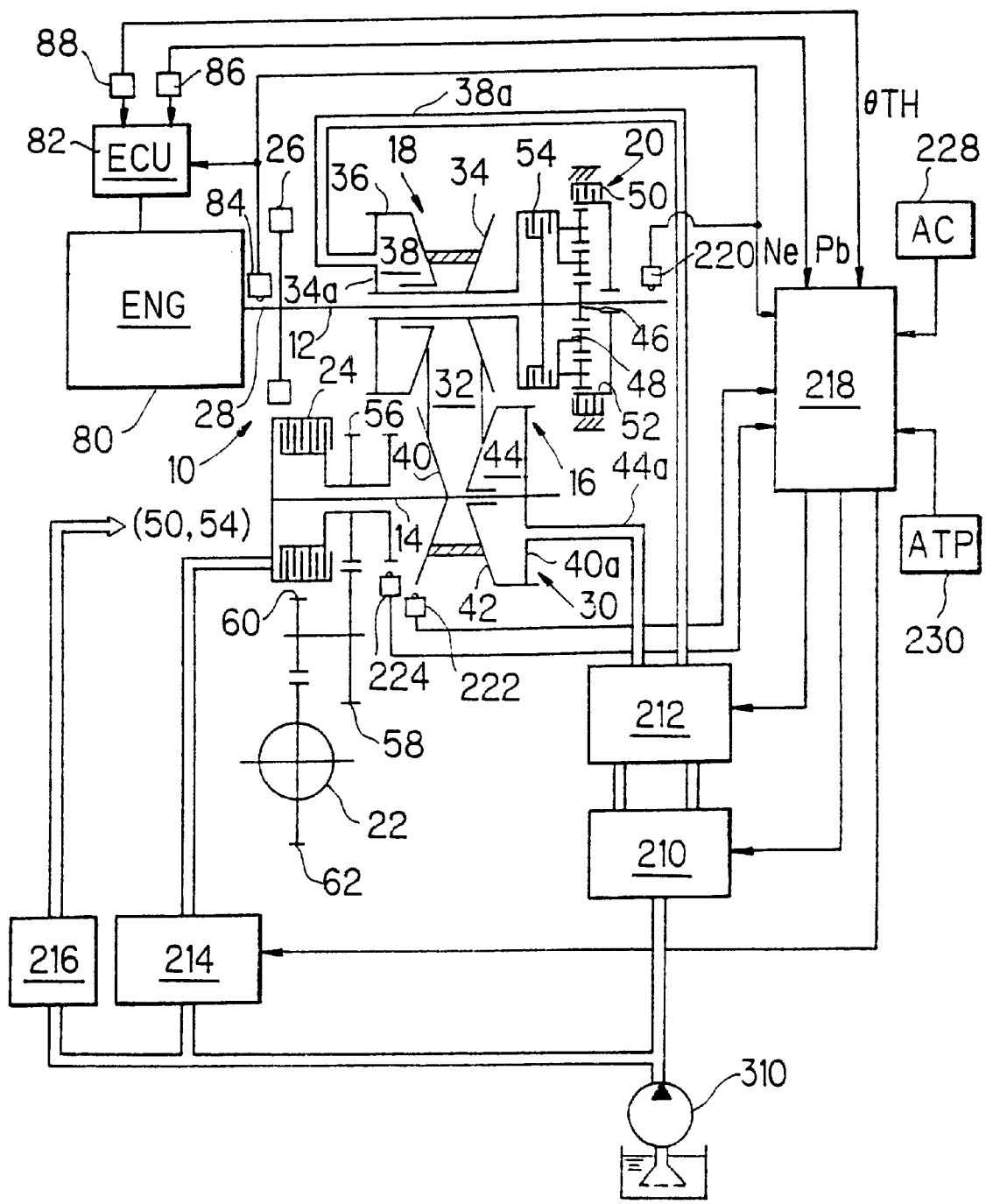
FIG. 1 is an overall schematic view showing a frictional engaging clutch control system for an automatic vehicle transmission according to the invention taking a start clutch in a continuously variable transmission as an example of the frictional engaging clutch.

FIG. 1 is an overall schematic view showing a frictional engaging clutch control system for an automatic vehicle transmission according to the invention taking a start clutch in a continuously variable transmission as an example of the frictional engaging clutch.

The belt-drive continuously variable transmission and its control system will be explained first.

The belt-drive continuously variable transmission 10 comprises a metal V-belt mechanism 16 located between a transmission input shaft 12 and a counter shaft 14, a planetary gear-type forward/reverse switching mechanism 20 located between the transmission input shaft 12 and a drive-side movable pulley 18, and a start clutch 24 (frictional engaging clutch) located between the counter shaft 14 and output members including a differential mechanism 22.

The output shaft 28 of an internal combustion engine 80 is connected to the transmission input shaft 12 of the continuously variable transmission 10 through a dual-mass flywheel 26 composed of, inter alia, two flywheels and torsion springs connecting the flywheels (all omitted from the drawing), and power transmitted to the differential mechanism 22 drives left and right wheels (not shown) connected to the differential mechanism 22 through a drive shaft (not shown).

The metal V-belt mechanism 16 comprises the drive-side movable pulley 18 mounted on the transmission input shaft 12, a driven-side movable pulley 30 mounted on the counter shaft 14, and a metal V-belt 32 wound about the two pulleys. The drive-side movable pulley 18 comprises a fixed pulley half 34 mounted on the transmission input shaft 12 and a movable pulley half 36 movable relative to the fixed pulley half 34 in the axial direction.

On the side of the movable pulley half 36 is formed a drive-side cylinder chamber 38 enclosed by a cylinder wall 34a connected to the fixed pulley half 34. Hydraulic pressure supplied to the drive-side cylinder chamber 38 through a hydraulic pressure line (passage) 38a produces lateral pressure for moving the movable pulley half 36 in the axial direction.

The driven-side movable pulley 30 comprises a fixed pulley half 40 mounted on the counter shaft 14 and a movable pulley half 42 movable relative to the fixed pulley half 40 in the axial direction. On the side of the movable pulley half 42 is formed a driven-side cylinder chamber 44 enclosed by a cylinder wall 40a connected to the fixed pulley half 40. Hydraulic pressure supplied to the driven-side cylinder 44 through a hydraulic pressure line (passage) 44a produces lateral pressure for moving the movable pulley half 42 in the axial direction.

A group of pressure-regulating valves, generically numbered 210, for determining pulley-control hydraulic pressure supplied to the drive-side cylinder chamber 38 and the driven-side cylinder chamber 44, and a group of speed-ratio control valves generally numbered by 212 is provided for supplying the pulley-control hydraulic pressure to the cylinder chambers 38 and 44. These determine appropriate lateral pulley pressures at which no V-belt 32 slip occurs and vary the width of the pulleys 18, 30 to vary the radius of the V-belt 32 wound about the pulleys 18, 30, thereby continuously varying the speed ratio.

The planetary gear-type forward/reverse switching mechanism 20 comprises a sun gear 46 connected to the transmission input shaft 12, a carrier 48 connected to the fixed pulley half 34, a ring gear 52 that is immobilized by a reverse brake 50, and a forward clutch 54 that connects the sun gear 46 and the carrier 48.

When the forward clutch 54 engages, all gears (sun gear 46, carrier 48 and ring gear 52) rotate unitarily with the transmission input shaft 12 to drive the drive-side movable pulley 18 in the same direction (forward) as the transmission input shaft 12. In the illustrated example having a double pinion planetary gear, engagement of the reverse brake 50 immobilizes the ring gear 52 so that the carrier 48 is driven reversely from the sun gear 46 and the drive-side movable pulley 18 is driven in the opposite direction (reverse) from the transmission input shaft 12.

When both the forward clutch 54 and the reverse brake 50 are disengaged, the transmission of power through the forward/reverse switching mechanism 20 is cut off and no power is transmitted between the engine 80 and the drive-side movable pulley 18.

The start clutch 24 is for ON/OFF (engage/disengage) control of power transmission between the counter shaft 14 and the output members including the differential mechanism 22. When it is ON (engaged), power can be transmitted between the two. Therefore, when the start clutch 24 is ON, the engine output varied in speed ratio by the metal V-belt mechanism 16 is transmitted through the gears 56, 58, 60 and 62 to the differential mechanism 22, which distributes it to the left and right driven wheels.

When the start clutch 24 is OFF (disengaged), this power transmission is not effected and the transmission assumes a neutral state. The operation of the start clutch 24 is controlled by a pressure-control valve (specifically, a clutch control valve) 214, and the operation of the reverse brake 50 and the forward clutch 54 of the forward/reverse switching mechanism 20 is controlled by a manual shift valve 216 in response to the operation of a manual shift lever (not shown) manually operated by the vehicle driver.

More specifically, these valves are controlled in response to command signals sent from a controller 218 comprised of a microcomputer.

For this, an engine speed sensor 84 is provided at an appropriate location such as in the vicinity of the output shaft 28 of the engine 80 for generating a signal indicative of the engine speed Ne, while, a speed sensor 220 is provided in the vicinity of the transmission input shaft 12 for generating a signal indicative of its rotational speed Ndr, a speed sensor 222 is provided in the vicinity of the driven-side movable pulley 30 for generating a signal indicative of its rotational speed, i.e., the rotational speed Ndn of the input shaft of the start clutch 24, and a speed sensor 224 is provided in the vicinity of the gear 56 for generating a signal indicative of its rotational speed, i.e., the rotational speed Nout of the output shaft of the start clutch 24.

All of these speed sensors are electromagnetic pickups which send the signals to the controller 218. The controller 218 is connected with another controller (illustrated as "ECU" in the figure) 82 which controls the operation of the engine 80 and inputs engine operating parameters including manifold absolute pressure Pb and throttle opening θTH from the ECU 82.

Furthermore, an air-conditioner switch 228 (illustrated as "AC") is provided for generating an ON signal when an air conditioner (not shown) is in operation, and a selector switch 230 (illustrated as "ATP") which generates a signal indicative of a shift range position (D, N, P, . . . ; corresponding to the spool position of the manual shift valve 216) selected through the manual shift lever by the vehicle driver. These signals are also sent to the controller 218.

Figure 2:
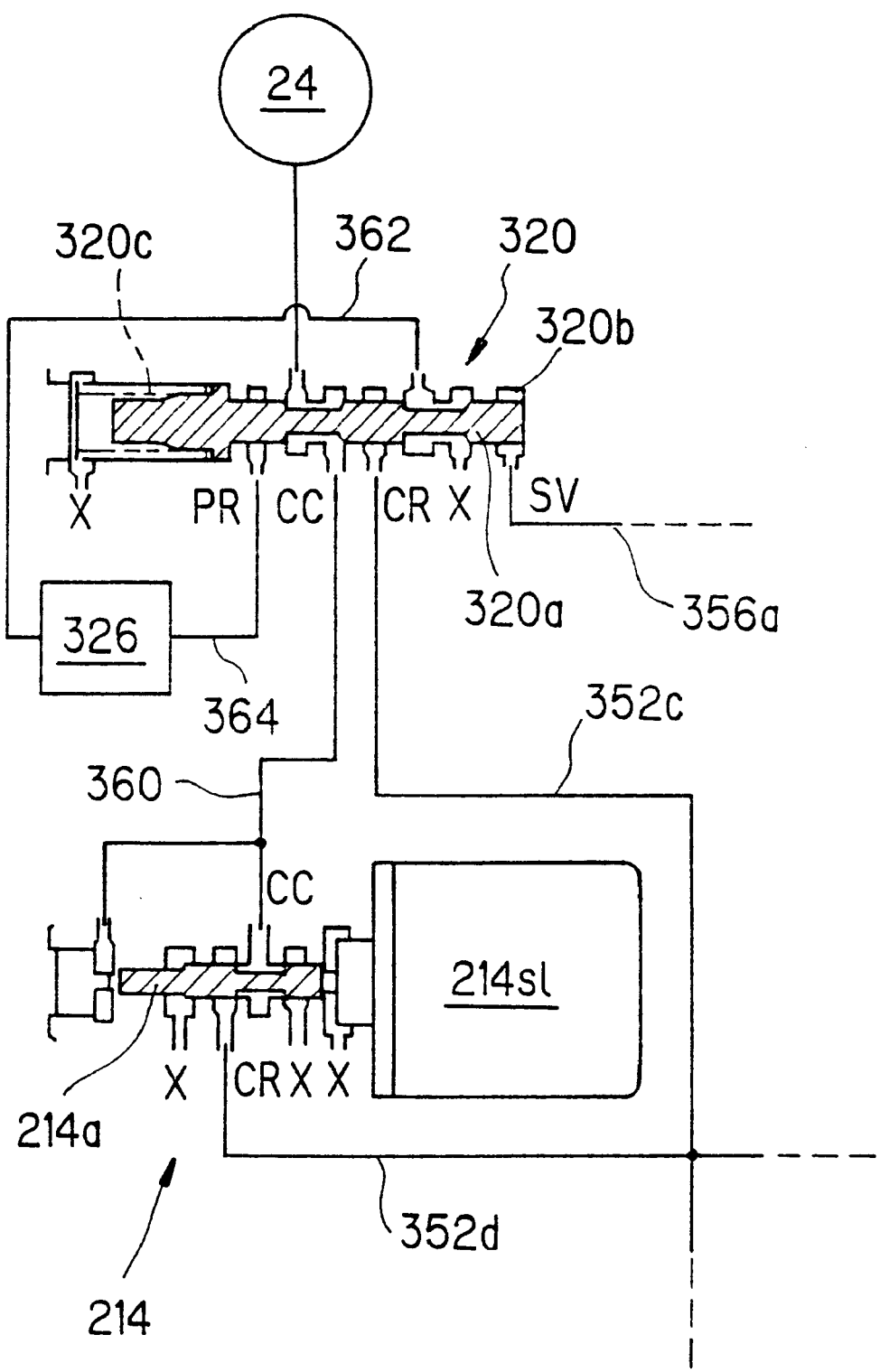
FIG. 2 is a hydraulic circuit diagram showing a clutch control valve for controlling the pressure of a start clutch illustrated in FIG. 1.

The clutch control valve (hydraulic pressure-control valve) 214 which controls the operation of the start clutch 24 will be explained with reference to FIG. 2.

Oil delivered by a hydraulic pump 310 (shown in FIG. 1) is passed through a high-pressure-regulating valve (not shown), which regulates it to a prescribed high pulley-control pressure PH, and through a pressure-reducing valve (not shown), which regulates it to a substantially constant hydraulic pressure (clutch-reducing pressure CR), and is then supplied to the clutch control valve 214 through the line-pressure supply line (passage) 352d.

The clutch control valve 214 is equipped with an electromagnetic linear solenoid 214sl, which presses a spool 214a housed in the valve 214. The clutch-reducing pressure CR is regulated by the current passed through the linear solenoid 214sl (the solenoid load) and supplied to a shift-inhibitor valve 320 as a clutch-control pressure CC.

The shift-inhibiter valve 320 has a spool 320a. When the spool 320a has moved to the right in the figure, the shift-valve 320 supplies the clutch-control pressure CC (supplied from the passage 360) to the start clutch 24. The start clutch 24 is therefore controlled to be engaged in response to the clutch-control pressure. It should be noted that, in this specification, words indicating direction such as left, right, up and down mean direction in the drawings.

A shift-control pressure SV supplied to a right hydraulic chamber 320b increases or rises as the transmission speed ratio decreases (close to the highest gear ratio). In other words, in order to decrease the transmission speed ratio, the width of the pulley 18 (the distance between the fixed pulley half 34 and the movable pulley half 36) should be less than the width of the pulley 30 such that the radius of the V-belt 32 wound about the pulley 18 is greater than that about the pulley 30. The hydraulic pressure to be supplied to the cylinder chamber 38 should accordingly be made higher than that to the cylinder chamber 44. This can be achieved by increasing the shift-control pressure SV to by supplied to the shift-valve so as to push its spool to the right such that the cylinder chamber 38 is supplied with the high pulley-control pressure PH and the cylinder chamber 44 is supplied with a low pulley-control pressure PL.

The transmission speed ratio is controlled to the highest side as the vehicle travel speed increases and the shift-control pressure SV to be supplied to the shift-inhibiter valve right hydraulic chamber 320b increases, this pushes the spool 320a to the left. At that instant, the clutch-reducing pressure CR is supplied to a pitot-regulator valve 326 which regulates the pressure to a pitot-pressure PR (corresponding to the engine speed Ne), which is supplied back to the shift-inhibiter valve 320 through a line (passage) 364 and is then supplied to the start clutch 24. Thus, when the speed ratio is at the highest side typically during vehicle high speed running, the start clutch 24 is controlled its engagement in response to the pitot-pressure PR. More generally, the start clutch 24 is controlled such that the clutch-control pressure becomes a desired clutch-control pressure obtained by correcting a basic clutch-control pressure determined based on the engine speed Ne by parameters including throttle opening θTH, as will be explained later.

The frictional engaging clutch control system for an automatic vehicle transmission according to the embodiment will be explained. The control system is the aforesaid controller 218.

Figure 3:
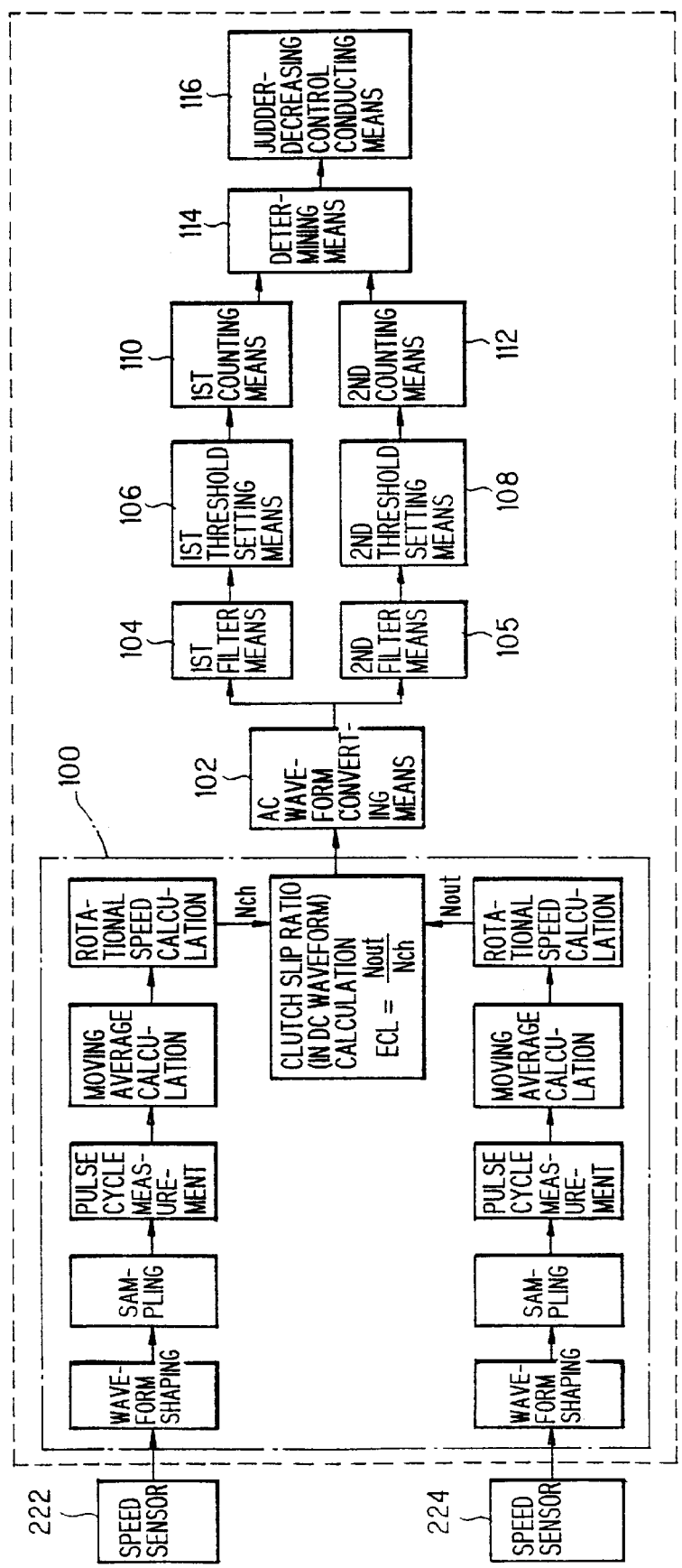
FIG. 3 is a block diagram showing the details of a frictional engaging clutch control system illustrated in FIG. 1.

FIG. 3 is a block diagram showing the control system in a functional manner.

As illustrated, the control system includes rotational speed fluctuation detecting means generically designated by a reference numeral 100.

The rotational speed fluctuation detecting means inputs the signals in pulse trains generated by the speed sensors 222, 224 and shapes the pulse waveforms. Then, it samples the shaped pulse waveforms respectively at an interval ranging from 4 to 11 msec to measure pulse cycles, calculates moving averages thereof, and based on the moving average, calculates the rotational speed at an interval of 5 msec to obtain Ndn, Nout. More precisely, the aforesaid input shaft rotational speed Ndn and the output shaft rotational speed Nout of the start clutch 24 are thus determined. Then, the slip ratio of the start clutch 24 (named ECL) is calculated as follows.

$ECL = Nout/Ndn [\%]$.

The calculated start clutch slip ratio ECL is then input to an ac waveform converting means 102 which converts ECL into an ac (alternating current) waveform. The alternating current waveform is then input to a first filter means (specifically, a band-pass filter, more specifically IIR (infinite impulse response) digital filter; referred to later as "judder filter") 104 and a second filter means (specifically, a band-pass filter, more specifically IIR (infinite impulse response) digital filter; referred to later as "disturbance filter") 105, and is filtered there. The judder filter transmits the frequency components of 25 Hz to 35 Hz of the ac waveform, while the disturbance filter 105 transmits that of 5 Hz to 15 Hz of the waveform.

A first threshold setting means 106 and a second threshold setting means 108 are provided to set a first threshold and a second threshold. The waveform filtered at the first filtering means 104 and the first threshold set are input to a first counting means 110 where the number of times (NTEX) at which the filtered waveform exceeds the first threshold is counted. Similarly, the waveform filtered at the second filter means 105 and the second threshold set are input to a second counting means 112 where the number of times (NTEX) at which the filtered waveform exceeds the second threshold is counted.

The counts are then input to a determining means 114 where it is determined whether the vibration was due to judder or due to a caused by, for example, the unevenness of road surface. The result of determination is input to a judder-decreasing control conducting means 116 which conducts a control to decrease the judder when the occurrence of judder is determined.

The above will explained with reference to graphs illustrated in FIG. 4, wherein graphs (1) show start clutch slip ratio ECL expressed in dc (direct current) waveforms. Graphs (2) shows those converted into ac waveforms and graphs (3) shows filtered waveforms. In the graphs, the left shows waveforms when judder has occurred, and the right shows waveforms when vibrational disturbance caused by, for example, unevenness of road surface has occurred. It can be understood from the graphs that the waveform peaks at or near 30 Hz when a judder has occurred, while the waveform peaks at or near 10 Hz when a vibrational disturbance has occurred.

The frictional engaging clutch control system according to the invention is based on this fact and is configured such that the clutch slip ratio is calculated, is then converted into an ac waveform, is then filtered to extract waveforms (frequency components) which are then compared with the threshold corresponding thereto. The number of times (NTEX) at which peaks in the extracted waveform exceed the individual thresholds is counted and when the count has reached reference values, it is determined that judder or vibrational disturbance has occurred.

Assuming the amplitude of ac waveform as 100%, the threshold for judder determination is set to be 3%, while that for vibrational disturbance determination 4%. In order to prevent erroneous determination, and to ensure correct determination by confirming the continuation of judder, the reference value for judder determination is, for example, set to be 3. The reference value for vibrational disturbance determination is set to 1, since this vibration is due to operation on a bumpy road and no control is possible. Consequently, if the extracted waveform peaks over the threshold once, it is determined that the vibration is vibrational disturbance.

Figure 4:
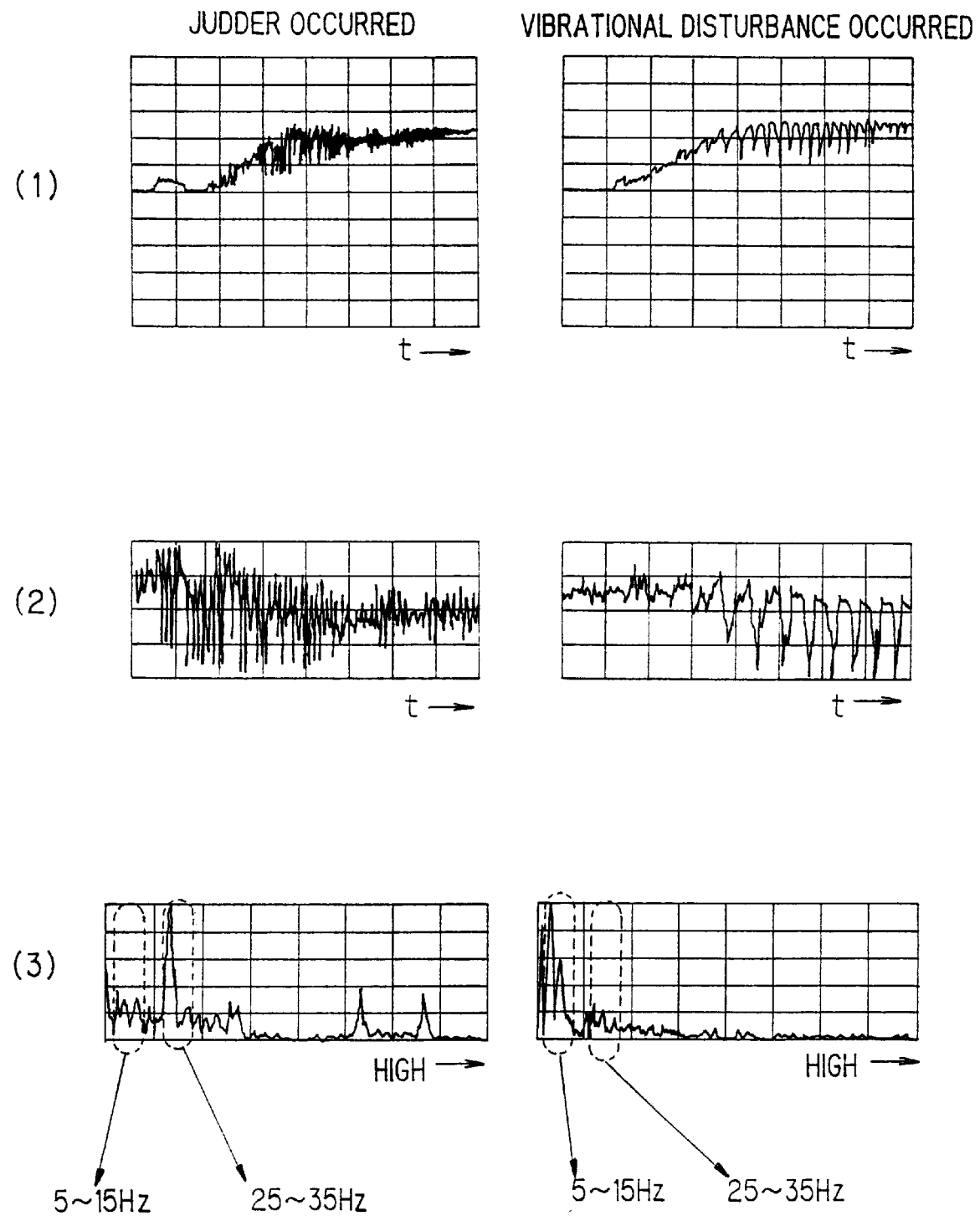
FIG. 4 (1)(2)(3) are graphs showing test (simulation) data of waveforms when judder or vibrational disturbance occurred.
Figure 5:
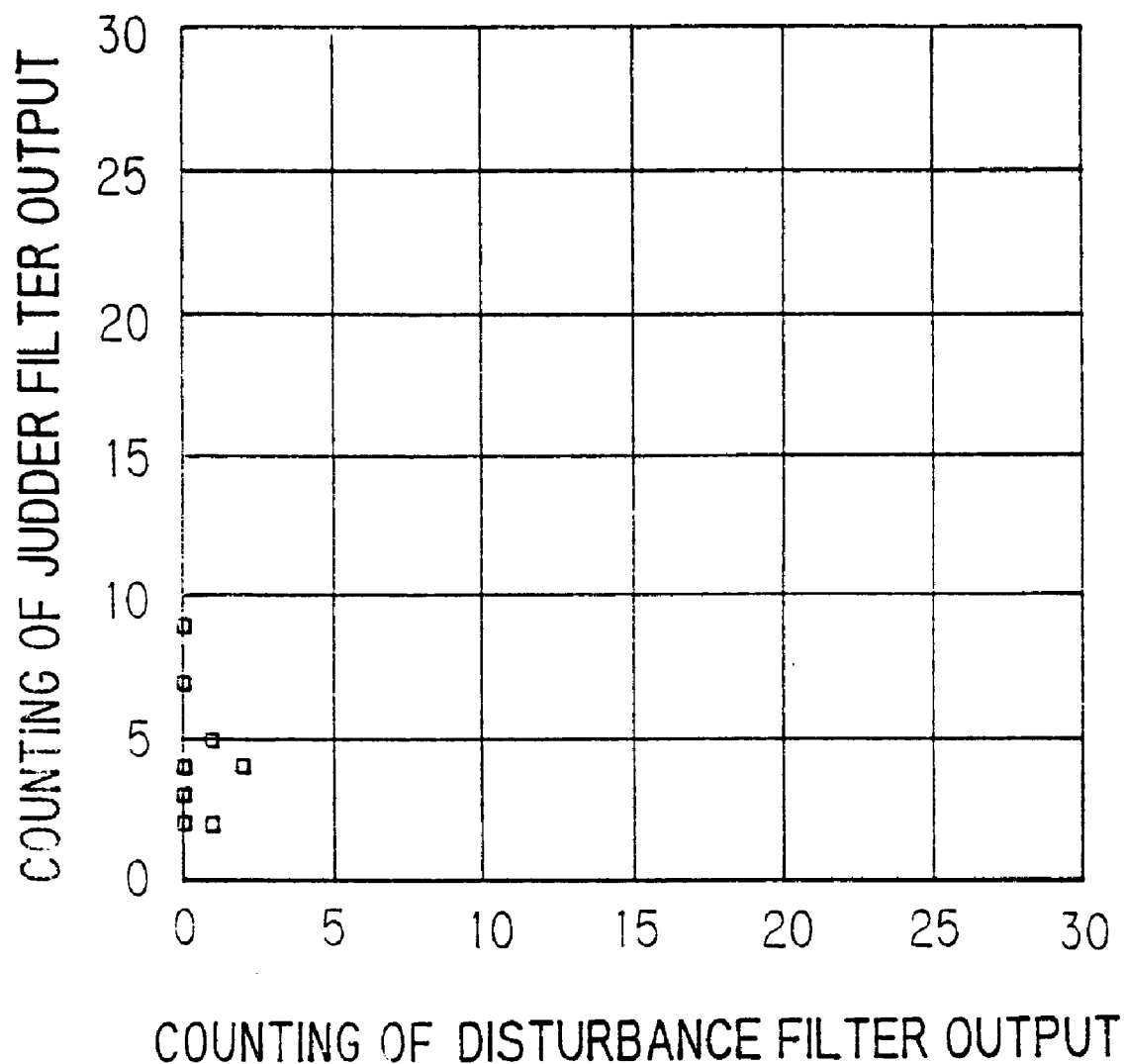
FIG. 5 is a graph showing test (simulation) data in which thresholds for judder and vibrational disturbance are set to be 3% and 4% when the waveforms shown in FIG. 4 are assumed to be 100%.

FIG. 5 is a graph showing test (simulation) data in which thresholds for judder and vibrational disturbance are set to be 3% and 4% when the waveforms shown in FIG. 4 are assumed to be 100%. It can be seen that the setting of threshold in this manner ensures proper judder determination.

Figure 6:
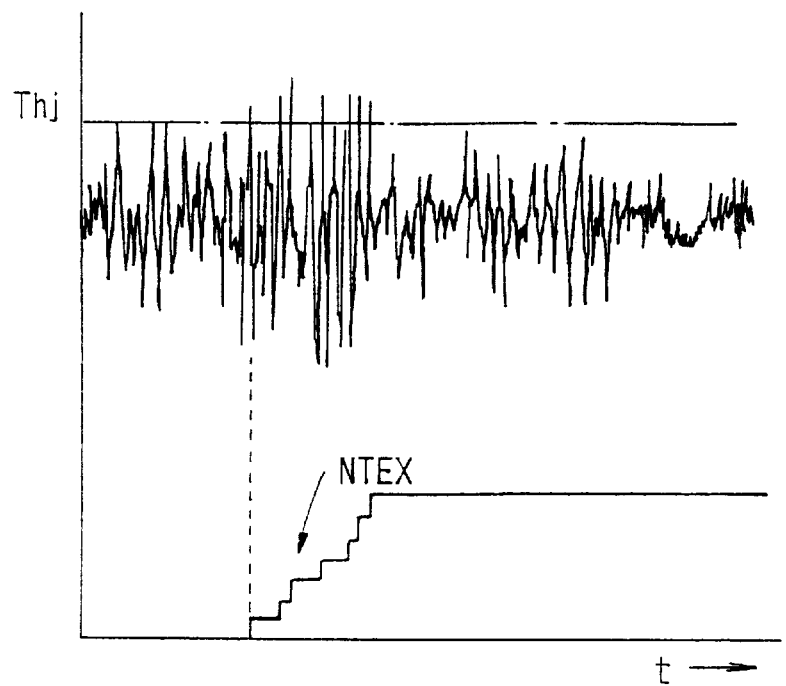
FIG. 6 is a graph showing test (simulation) data when the threshold illustrated in FIG. 5 is used for comparison with waveforms illustrated in FIG. 4 for judder determination.
Figure 7:
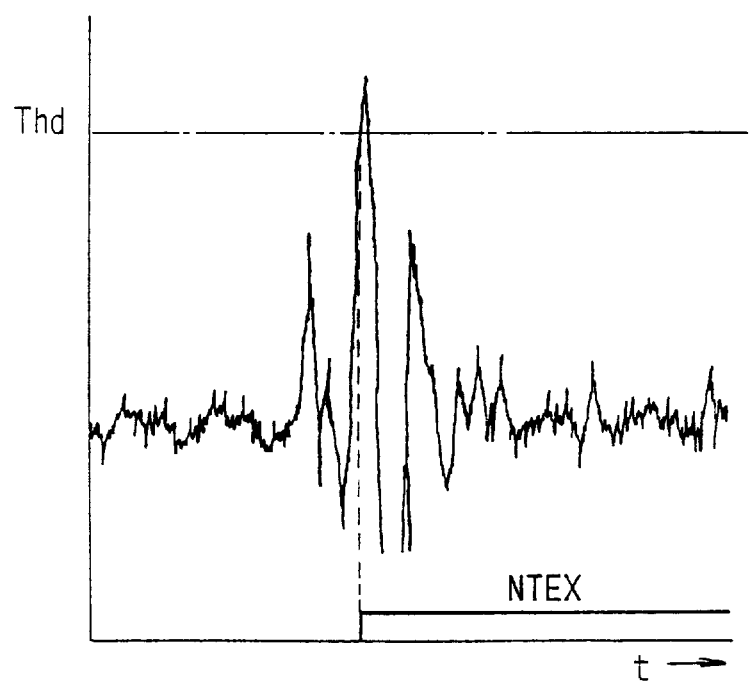
FIG. 7 is a graph showing test (simulation) data when the threshold illustrated in FIG. 5 is used for comparison with waveforms illustrated in FIG. 4 for vibrational disturbance determination.

FIG. 6 is a graph showing test (simulation) data when the threshold illustrated in FIG. 5 is used for comparison with waveforms illustrated in FIG. 4 for judder determination, and FIG. 7 is a view, similar to FIG. 6, but showing that for vibrational disturbance determination. In FIG. 6 and 7, "Thj" indicates the threshold for judder determination, while "Thd" is for vibrational disturbance determination.

Based on the foregoing, the operation of the control system according to the invention will be explained with reference to the flow chart shown in FIG. 8.

The program begins at S10 in which it is determined whether the selected range is D range and when the result is negative, the program is immediately terminated. When the result is affirmative, on the other hand, the program proceeds to S12 in which it is determined whether the throttle valve is opened and when the result is negative, the program is terminated. Since a judder occurs when the start clutch 24 is controlled in a slip-state during vehicle starting, it is determined in these steps whether the vehicle is being started to run in the forward direction. When the result in S12 is affirmative, the program proceeds to S14 in which the aforesaid filtering is conducted.

Figure 9:
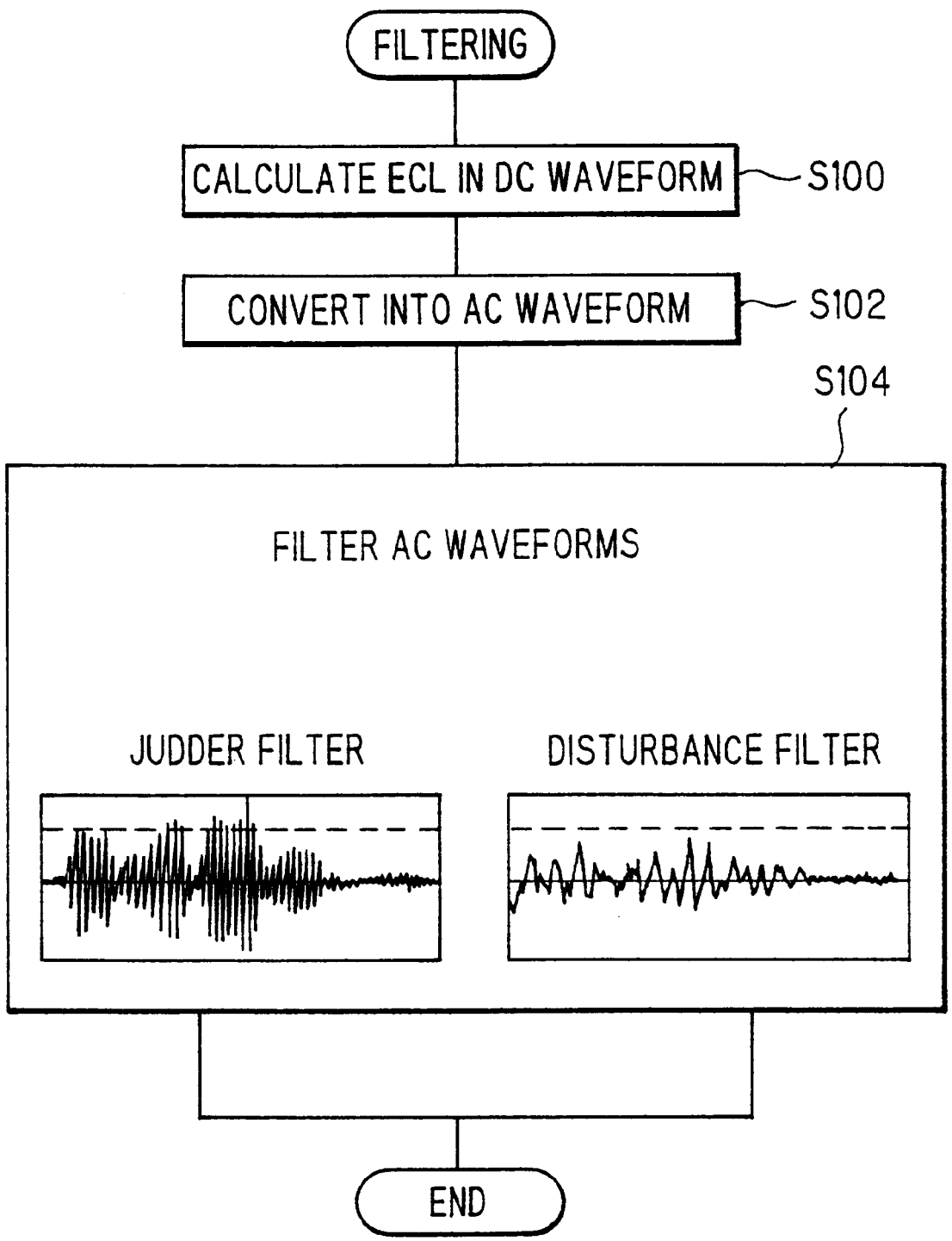
FIG. 9 is a flow chart showing a subroutine of filtering in the flow chart of FIG. 8.

FIG. 9 is a flow chart showing the subroutine for this.

The program begins at S100 in which the start clutch slip ratio ECL in a dc waveform is calculated and proceeds to S102 in which the dc waveform is converted into an ac waveform, to S104 in which the ac waveform is filtered as illustrated.

Figure 8:
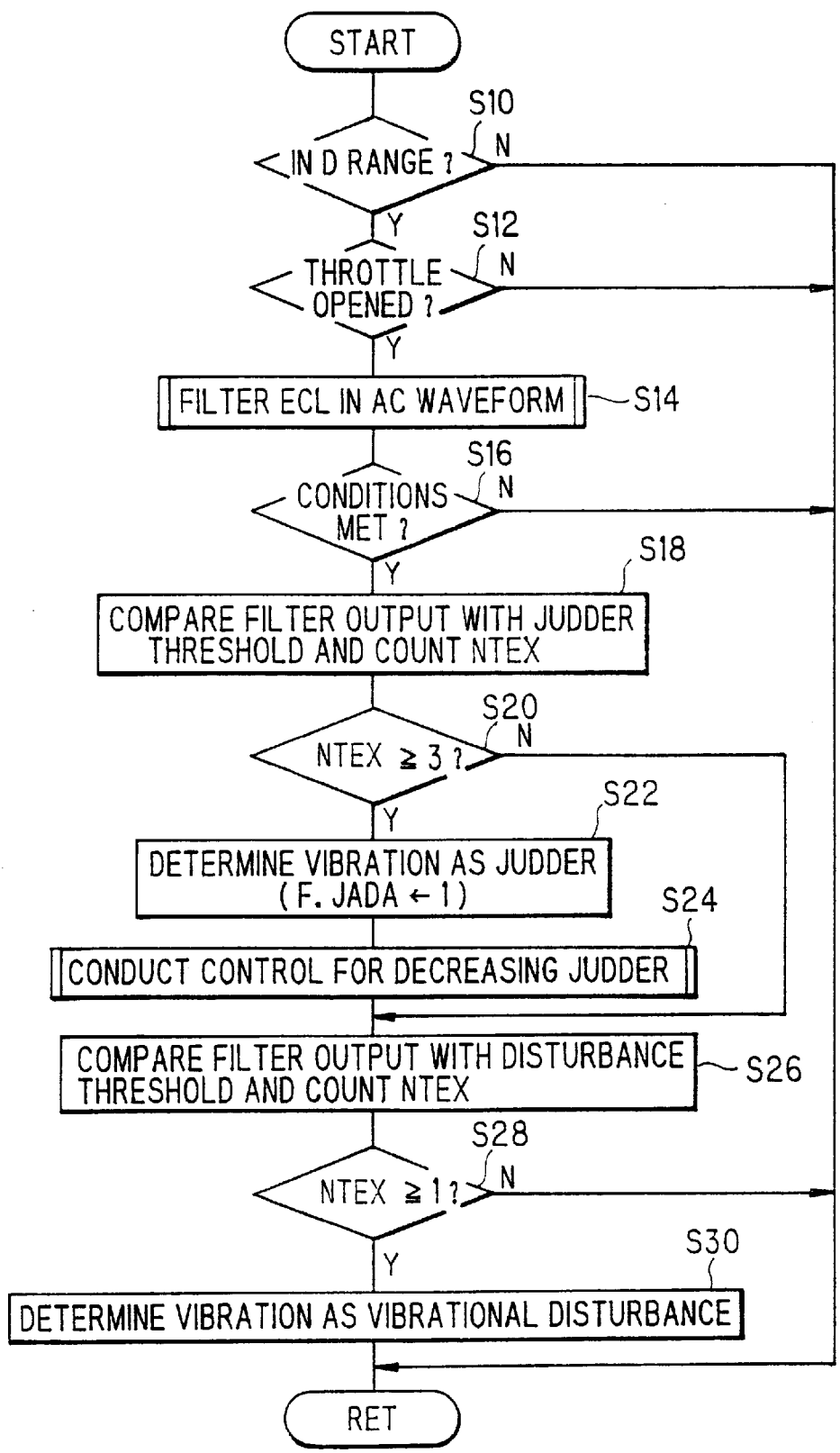
FIG. 8 is a flow chart showing the operation of the frictional engaging clutch control system illustrated in FIG. 1.

Returning to the flow chart of FIG. 8, the program proceeds to S16 it is checked whether a condition for determination is met. This is done by checking whether the vehicle speed is within a prescribed range. When the result is negative, the program is terminated. On the other hand, when the result is affirmative, the program proceeds to S18 in which the filtered waveform is compared with the judder threshold and the number of times (NTEX) at which the waveform peak exceeds the reference value is counted.

The program then proceeds to S20 in which it is determined whether the count is not less than 3 and when the result is affirmative, the program proceeds to S22 in which it is determined that the vibration is a judder and the bit of a flag F.JADA is set to 1, and to S24 in which a control is conducted for decreasing the judder.

Figure 10:
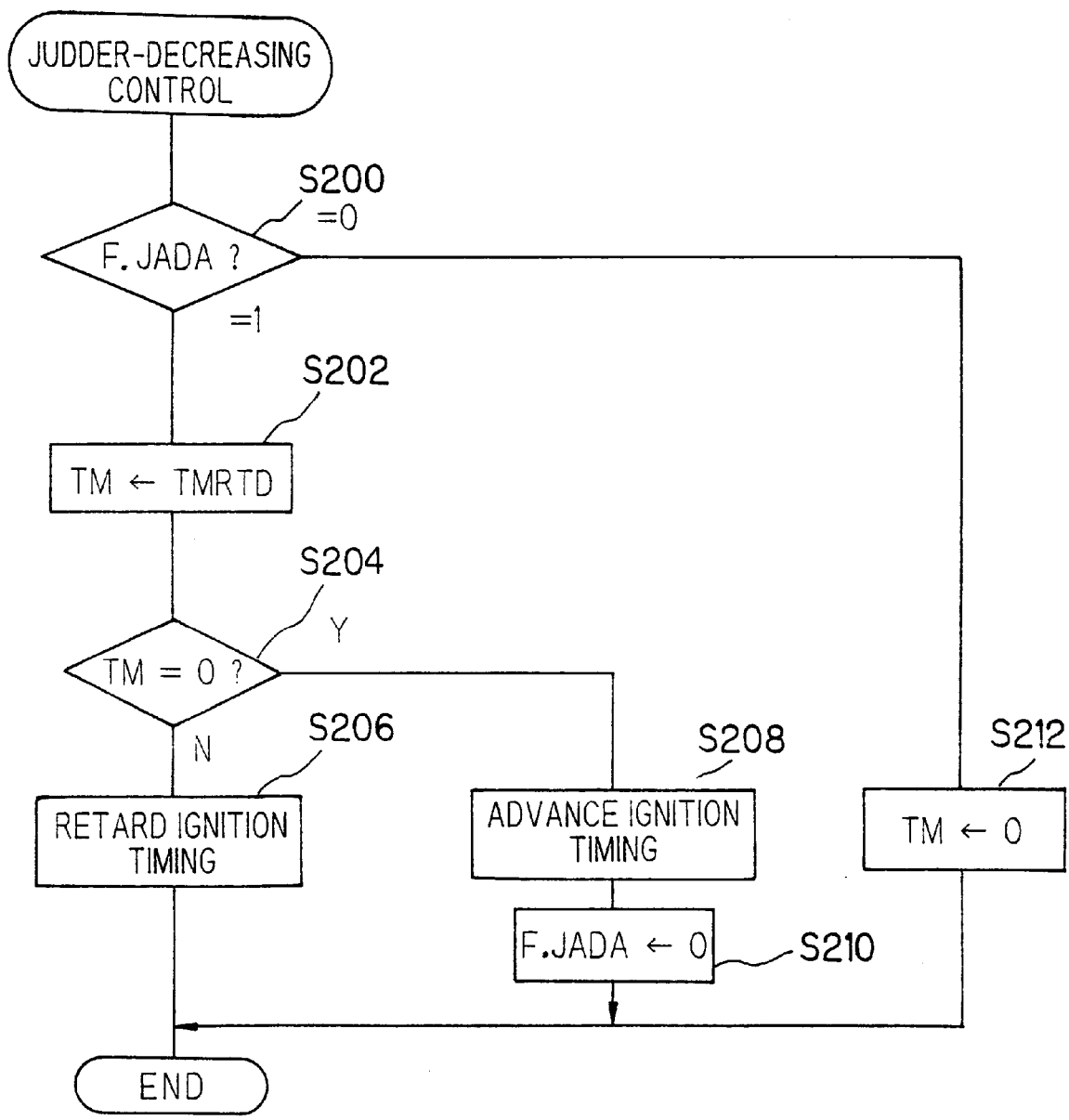
FIG. 10 is a flow chart showing a subroutine of judder-decreasing control in the flow chart of FIG. 8.

FIG. 10 is a flow chart showing the subroutine for this. In this embodiment, the judder-decreasing control is conducted by retarding the ignition timing supplied to the engine. This is because a judder occurs at a phase lag in torque transmission, i.e., when the torque generated by the engine is not sufficiently transmitted. Therefore, the engine output torque is temporality decreased by retarding the ignition timing.

In the flow chart, the program begins at S200 in which it is determined whether the bit of the flag F.JADA is 1, in other words, it is determined whether the occurrence of judder has been determined. When it is determined in S200 that the flag bit is 1, the program proceeds to S202 in which a timer (down counter) TM is set with a predetermined value (period) TMRTD and is started to measure time lapse. The program then proceeds to S204 in which it is determined whether the timer value has reached zero.

Figure 11:
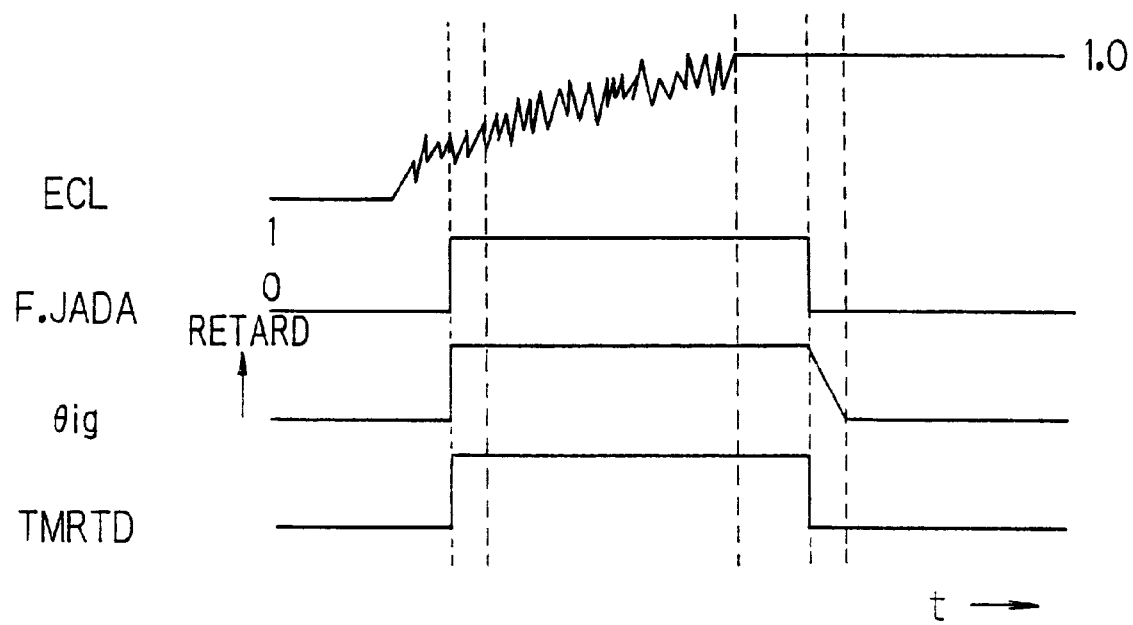
FIG. 11 is a time chart showing the procedures described in the flow chart of FIG. 10.

Since the timer has been just started, the result is naturally negative and the program proceeds to S206 in which the ignition timing θig is retarded by a predetermined amount. FIG. 11 illustrates this. On the other hand, when the result in S204 in the next or later loop is affirmative, the program proceeds to S208 in which the ignition timing is advanced by a unit amount, to S210 in which the bit of the flag F.JADA is reset to 0. As illustrated in FIG. 11, the ignition timing is advanced gradually by a unit amount such that the engine output torque does not change sharply. When the result in S200 is negative, the program proceeds to S212 in which the timer value is reset to zero and no ignition timing retard is conducted.

Again returning to the explanation of FIG. 8, when the result in S20 is negative, the program skips S22 and S24. The program then proceeds to S26 in which the filtered waveform is compared with the disturbance threshold and the number of times (NTEX) at which the waveform peak exceeds the reference value is counted.

The program then proceeds to S28 in which it is determined whether the count is not less than 1 and when the result is affirmative, the program proceeds to S30 in which it is determined that the vibration is a judder and program is terminated. Since no control for decreasing vibrational disturbance can be effected it suffices if the vibration is determined to be that caused by judder. When the result in S28 is negative, the program is also terminated.

Having been configured in the foregoing manner, the control system according to this embodiment is simple in configuration, but can determine whether a vibration which has occurred on the vehicle is caused by judder or by a vibrational disturbance. Since the control for decreasing judder is conducted when the vibration is judder, the system effectively eliminates the unpleasant jolt due to judder. Moreover, as the control is conducted by decreasing engine output torque via ignition timing retarding, judder can be quickly be suppressed. Furthermore, the system determines the occurrence of judder in a transmission without a chain-transmission mechanism or the like.

Figure 12:
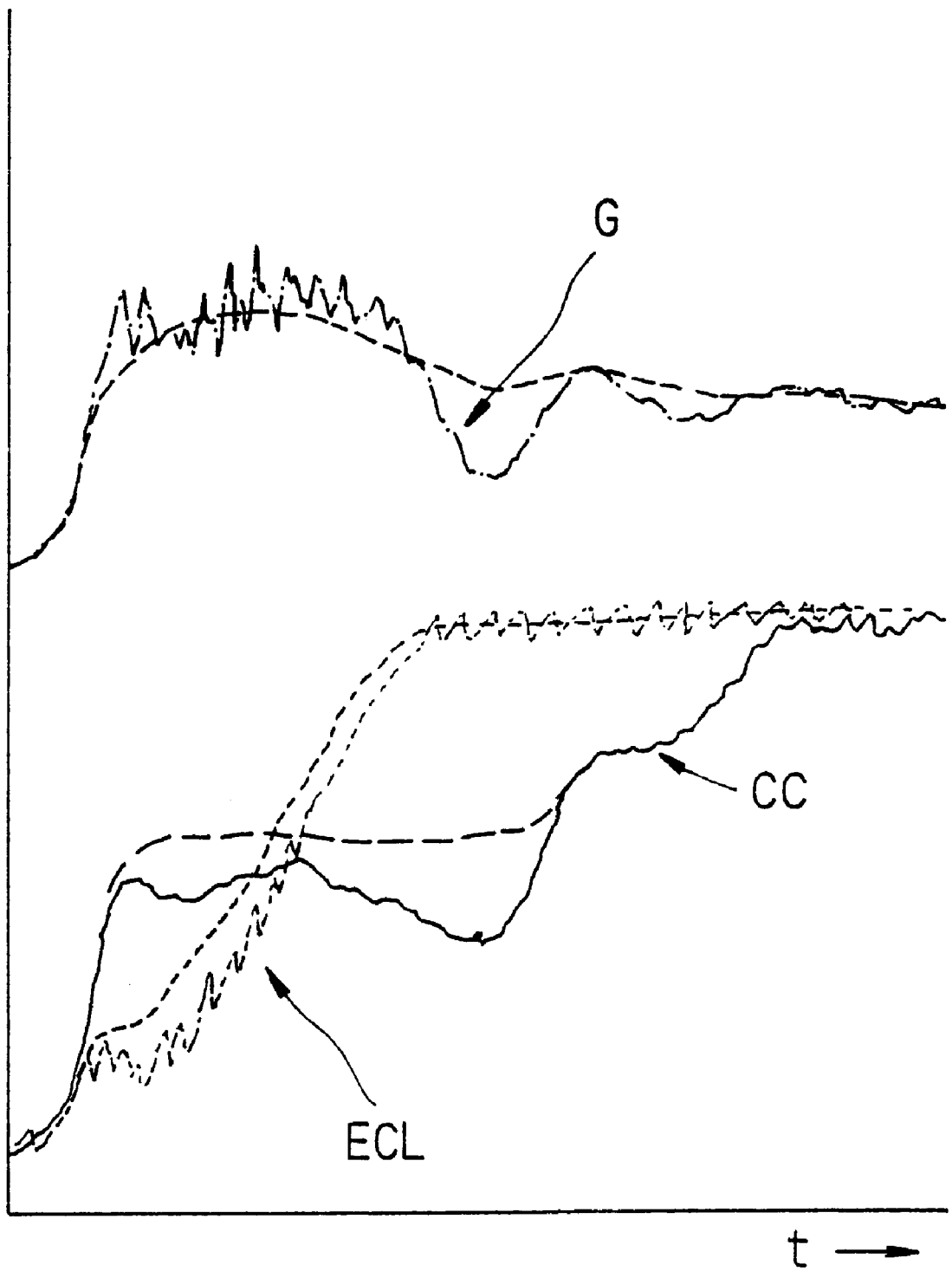
FIG. 12 is a graph showing test (simulation) data when judder occurred.
Figure 13:
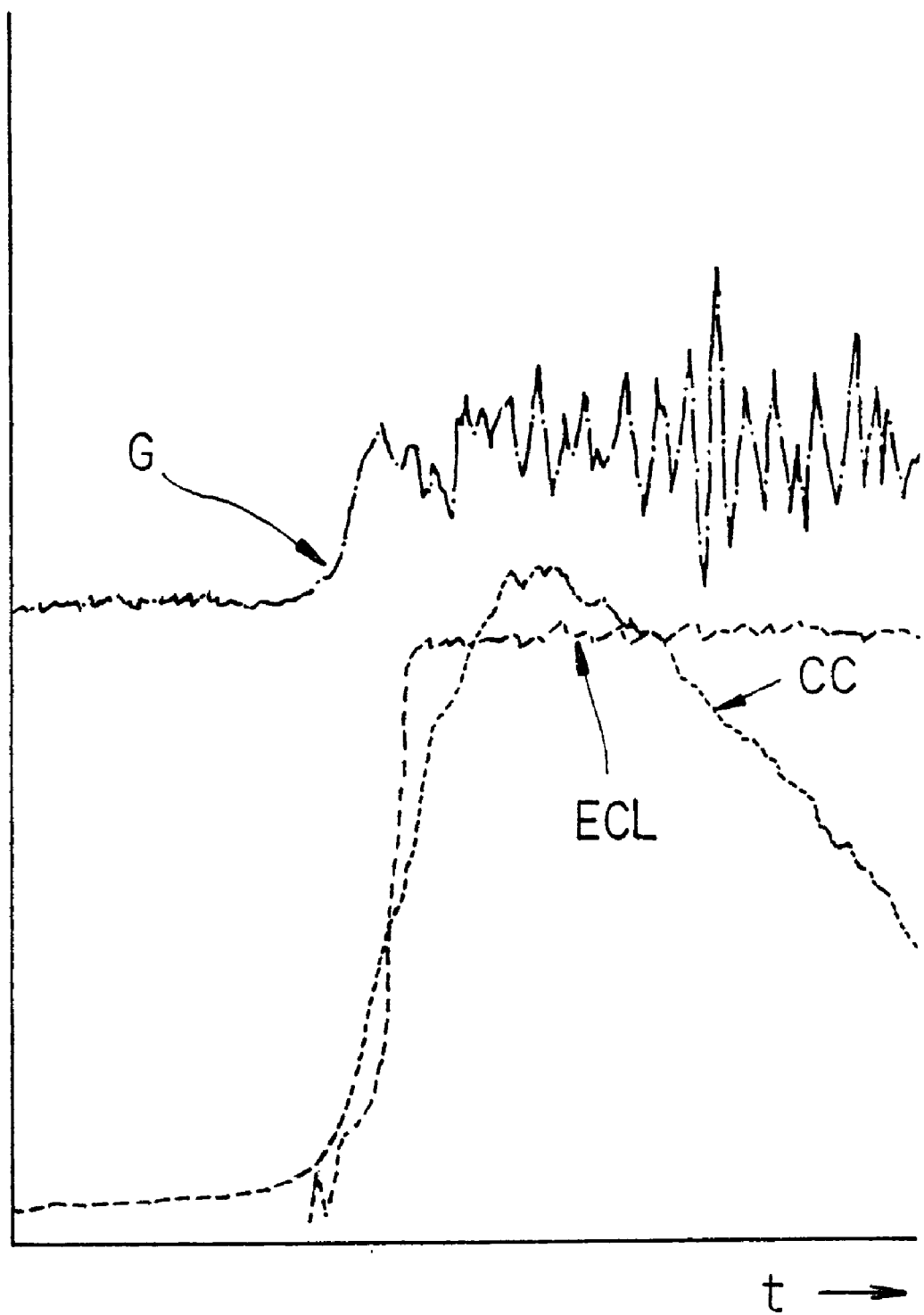
FIG. 13 is a graph showing test (simulation) data when vibrational disturbance occurred.

FIG. 12 is a graph showing test (simulation) data when judder has occurred and FIG. 13 is a graph showing test (simulation) data when vibrational disturbance has occurred. In the figures, G indicates the acceleration in the direction of vehicle travel, and CC indicates the aforesaid clutch-control pressure to be supplied to the start clutch 24. In FIG. 12, dashed lines show the result when the judder-decreasing control was conducted. From FIG. 12, it can be understood that the variation in acceleration G decreases when the judder was determined and suppressed.

Figure 14:
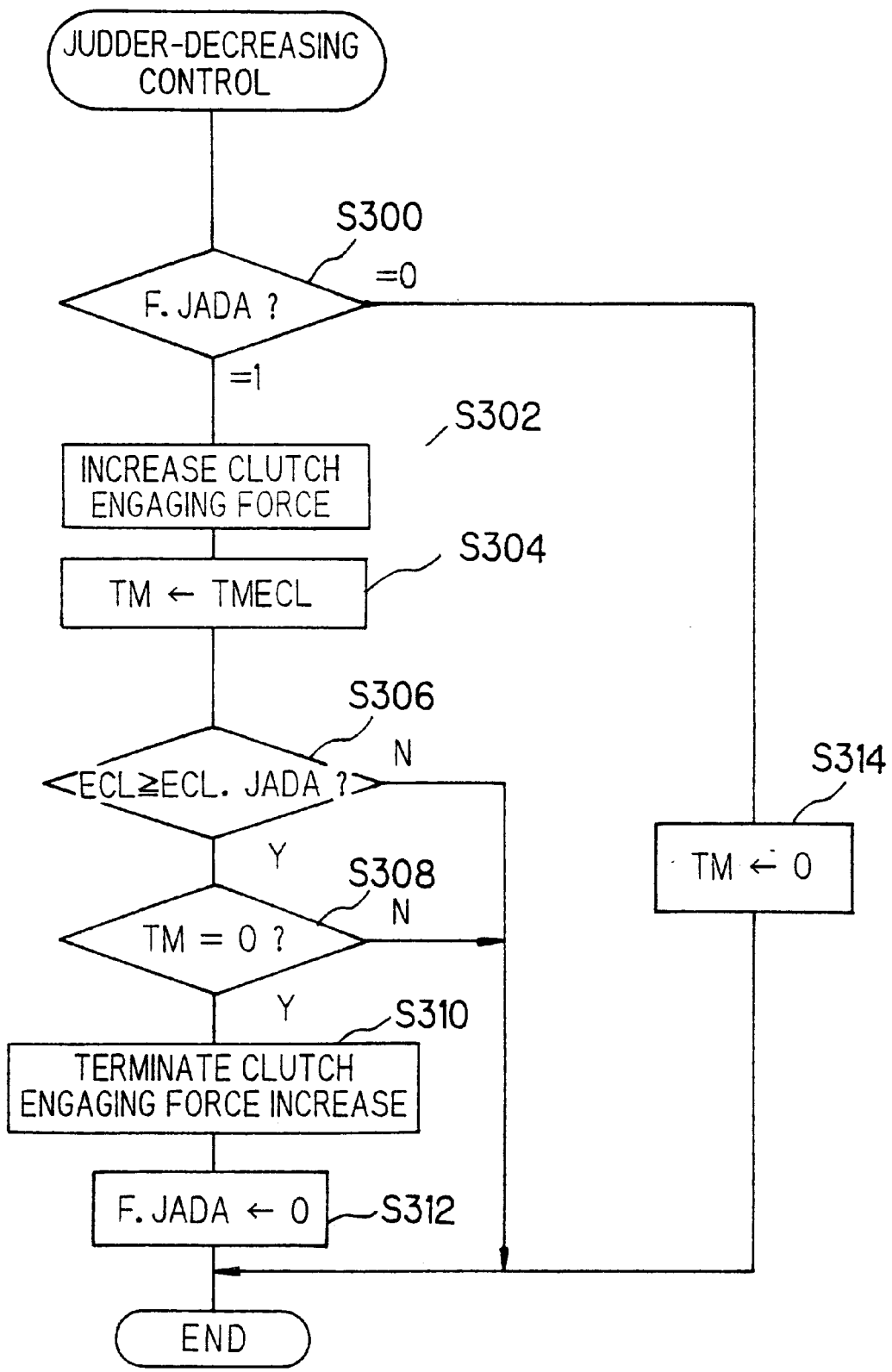
FIG. 14 is a view, similar to FIG. 10, but showing the operation of the frictional engaging clutch control system for an internal combustion engine according to a second embodiment of the invention.

FIG. 14 is a view, similar to FIG. 10, but showing the operation, more specifically the subroutine of S24 in the flow chart of FIG. 12 for judder-decreasing control, of the frictional engaging clutch control system for an internal combustion engine according to a second embodiment of the invention.

In the second embodiment, the engaging force of the start clutch 24 is increased to decrease judder. With this arrangement, since the torque transfer capacity of the clutch 24 is increased, judder can effectively be suppressed.

The program begins at S300 in which it is determined whether the bit of the flag F.JADA is 1 and when the result is affirmative, the program proceeds to S302 in which the clutch-control pressure CC to be supplied to the start clutch 24 is increased through the clutch control valve 214 so as to increase the clutch engaging force.

Figure 15:
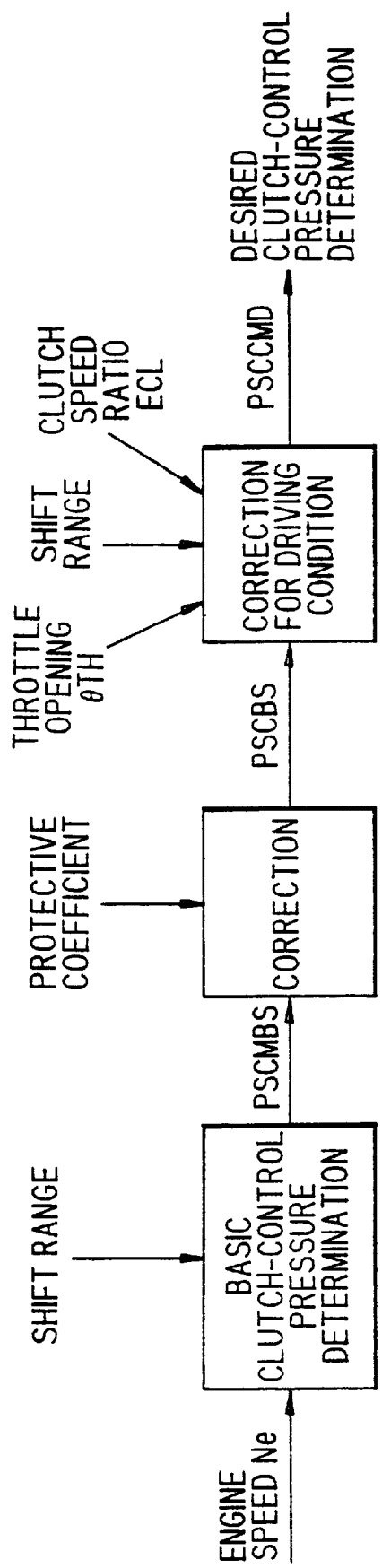
FIG. 15 is a block diagram showing the determination of a desired clutch-control pressure referred to in the flow chart of FIG. 14.
Figure 16:
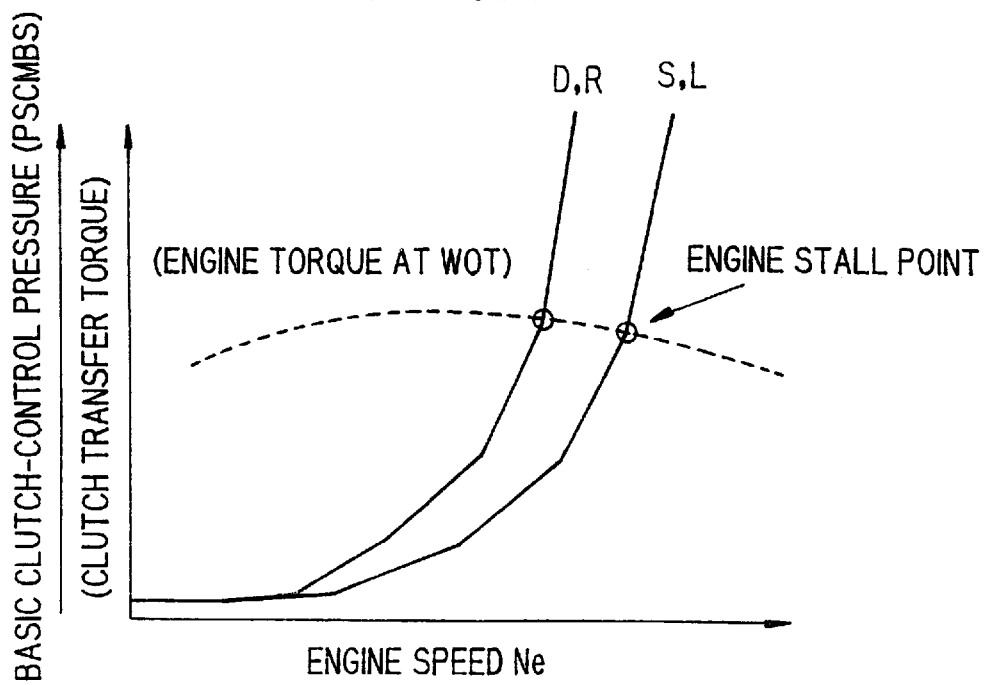
FIG. 16 is a graph showing the characteristics of mapped data defining a basic value of the desired clutch-control pressure referred to in the block diagram of FIG. 15.
Figure 17:
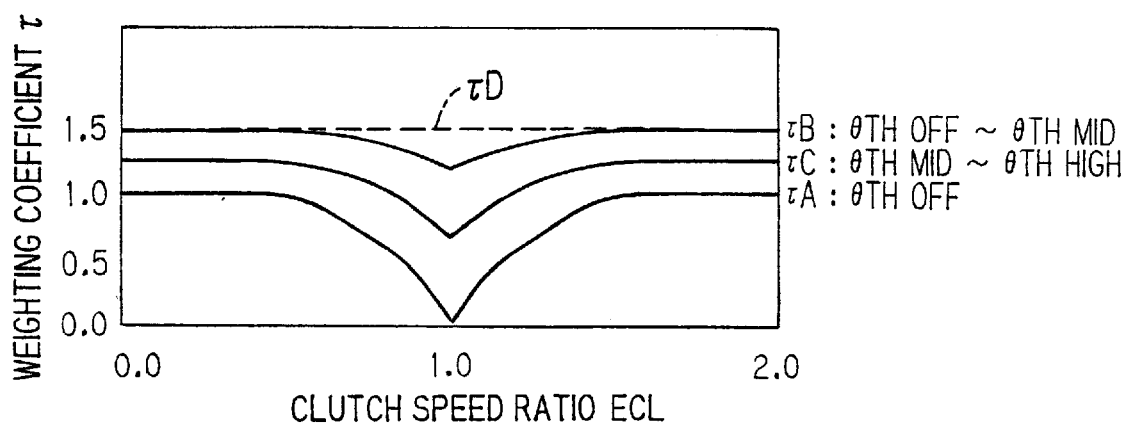
FIG. 17 is a graph showing the characteristics of mapped data defining weighting coefficient τ to be multiplied to the basic value to determine the desired clutch-control pressure referred to in the block diagram of FIG. 15.

Explaining the determination of the desired clutch-control pressure with reference to the block diagram of FIG. 15, a basic value of the clutch-control-pressure (determining the clutch transfer torque) PSCMBS by retrieval from mapped data using the engine speed Ne and the selected shift range as address data. The characteristics of this mapped data are shown in FIG. 16. The determined basic clutch-control-pressure is multiplied by a protective coefficient calculated from the temperature of the hydraulic fluid (oil) to obtain a corrected clutch-control-pressure. Then, using the throttle opening θTH, one from among three weighting coefficients τA, τB, τC is selected and based thereon, a weighting coefficient τ is selected from mapped data (whose characteristics are shown in FIG. 17) using the clutch speed ratio ECL as address datum. Then, using the retrieved weighting coefficient τ and the shift range position, another correction is effected on the corrected clutch-control-pressure and the desired clutch-control-pressure PSCCMD is finally determined. The start clutch 24 is controlled based on the desired clutch-control-pressure thus determined.

When the result in S300 is affirmative, the program proceeds to S302 in which, instead of τ, τD (shown in FIG. 17) is used as the weighting coefficient. Specifically, since the desired clutch-control pressure generated judder, the coefficient is replaced with τD (which is greater than τ) and τD is multiplied to the desired clutch-control pressure to increase or raise the same. The clutch engaging force is controlled to be increased in response to the raised desired value. Hereinafter, the desired or reference clutch slip ratio corresponding to the new desired clutch-control pressure is referred to as "ECL.JADA".

The program then proceeds to S304 in which the timer TM is set with a value (period) TMECL and is started, to S306 in which the clutch slip ratio is newly calculated and it is determined whether the newly calculated clutch slip ratio ECL is not less than the reference value ECL.JADA. When the result is affirmative, the program proceeds to S308 in which it is determined whether the timer value has reached zero and when the result is negative, the program is terminated.

When the result is affirmative, on the contrary, the program proceeds to S310 in which the correction for increasing clutch engaging force is terminated, to S312 in which the flag bit is reset to 0. When it is determined in S300 that the flag bit is 0, the program proceeds to S314 in which the timer value is reset to zero.

With the arrangement, the frictional engaging clutch control system according to the second embodiment can decrease judder by increasing the engaging force of the start clutch 24, thereby effectively eliminating the unpleasant jolt. At the same time, since the clutch engaging force is increased, the vehicle occupants can feel an improvement in acceleration. In the second embodiment, thus, both the decreasing of judder and improvement of acceleration are achieved.

Figure 18:
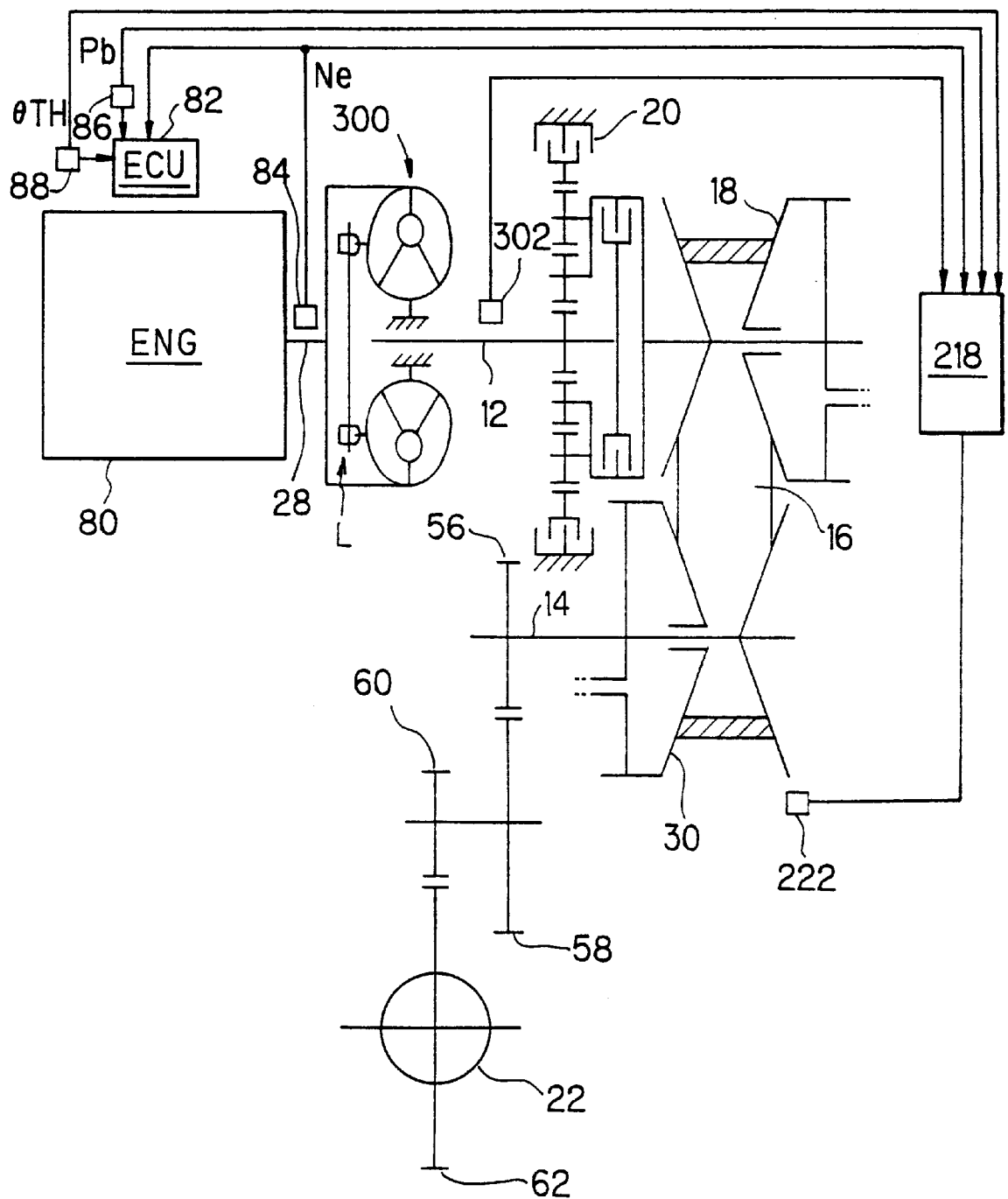
FIG. 18 is an overall schematic view showing a continuously variable transmission having torque converter to which the control system according to the foregoing embodiments can be applied.

FIG. 18 is an overall schematic view showing a continuously variable transmission having a torque converter to which the frictional engaging clutch control system according to the foregoing embodiments is applicable.

As shown in FIG. 18, a torque converter 300 is connected to the output shaft 28 of the engine 80 and the belt-drive continuously variable transmission 10 is connected as the stage following the torque converter 300. In other words, the start clutch 24 of the earlier embodiments is replaced by the torque converter 300. In FIG. 18, members like those in FIG. 1 are assigned the same reference symbols as those in FIG. 1. The details of the configuration is described in Japanese Laid-Open Patent Application No. Hei 6 (1994)-288,449.

Since the lock-up clutch L of the torque converter 300 is controlled in a slip-state in the transmission shown in FIG. 18, there may be the possibility that judder occurs due to a control hunting in the slippage amount. However, when a ratio between the outputs of the engine speed sensor 84 and a transmission input shaft speed sensor 302 is calculated to calculate a slip ratio (rotational speed change) of the torque converter 300, the calculated ratio is converted into an ac waveform which is filtered by filters similar to the judder filter and disturbance filter to extract frequency components of an appropriate range, and the number of times (NTEX) at which the filtered waveform peaks exceeds threshold values (appropriately set) is counted, it is also possible to determine the occurrence of judder from the counts and to conduct a control to decrease the same.

Figure 19:
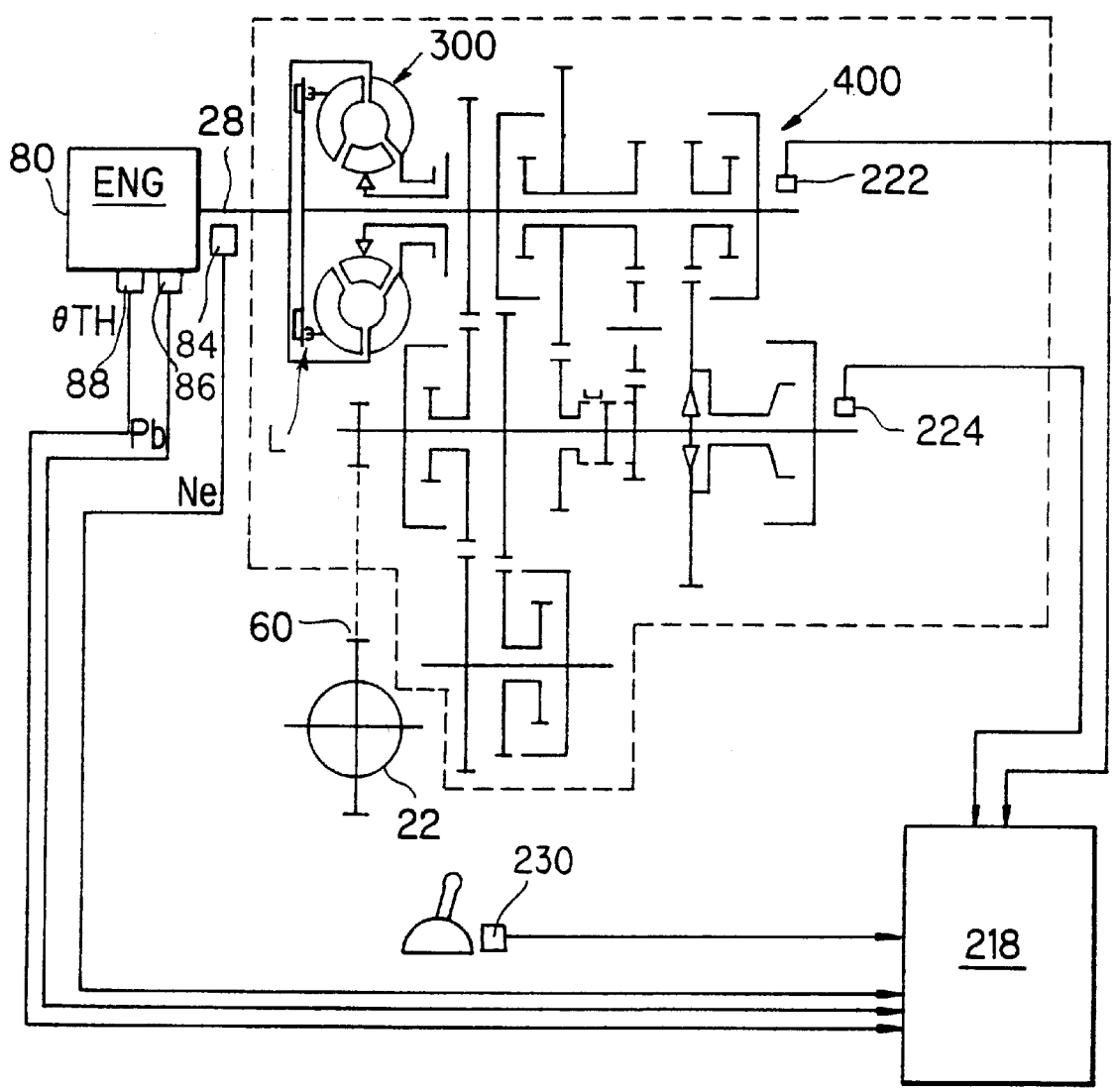
FIG. 19 is a view, similar to FIG. 18, but showing a multi-step transmission having torque converter to which the control system according to the foregoing embodiments can be applied.

FIG. 19 is a view, similar to FIG. 18, but showing a multi-step transmission having a torque converter to which the frictional engaging clutch control system according to the foregoing embodiments can be applied.

As shown in FIG. 19, the torque converter 300 is connected to the output shaft 28 of the engine 80 and a multi-step transmission 400 with four forward and one reverse speed is connected as the stage following the torque converter 300. In FIG. 19, members like those in FIG. 1 are assigned the same reference symbols as those in FIG. 1. Since the illustrated configuration is explained in the assignee's earlier application (Japanese Laid-Open Patent Application No. Hei 7(1995)-254,662), no detailed explanation will be given here. In the configuration, judder can be determined in the manner mentioned with reference to FIG. 18, using an output of a transmission input shaft speed sensor 222.

The transmission shown may also take the form of a type wherein the torque converter 300 and the first-gear one-way clutch COW are removed and the vehicle is started in first gear. The system can also be applied when a speed ratio of the first-gear one-way clutch COW is calculated from the engine speed sensor 84 and the transmission input shaft speed sensor 222.

As described in the above, the foregoing embodiments provide a system for controlling a frictional engaging clutch (start clutch 24, torque converter lock-up clutch L) installed in a transmission which transmits output torque generated by an internal combustion engine (80) mounted on a vehicle to wheels of the vehicle, including: judder discriminating means (S18 to S22) for discriminating that a vibration has occurred on the vehicle is a judder; and judder-decreasing control means (S22, S200 to S212, S300 to S314) for acting to decrease the judder when the judder discriminating means discriminates whether the vibration which has occurred on the vehicle is a judder. In the system, the judder discriminating means includes frictional engaging clutch rotational speed fluctuation detecting means (100) for detecting an output rotational speed fluctuation (ECL) of the frictional engaging clutch (start clutch 24, torque converter lock-up clutch L); first filter means (104) for transmitting a first range of frequency component of the detected output rotational speed fluctuation of the frictional engaging clutch; first threshold setting means (106, S18) for setting a first threshold (Thj); first counting means (110, S18) for comparing the first range of frequency component transmitted the filter with the first threshold to count the number of times (NTEX) at which the first range of frequency component exceeds the first threshold; and judder determining means (114, S20, S22) for determining that the vibration which has occurred on the vehicle is a judder when the counted number exceeds a reference value.

The system further includes second filter means (105) for transmitting a second range of frequency component of the detected output rotational speed fluctuation of the frictional engaging clutch; second threshold setting means (108) for setting a second threshold (Thd); second counting means (112, S26) for comparing the second range of frequency component transmitted the filter with the second threshold to count the number of times (NTEX) at which the second range of frequency component exceeds the second threshold; and vibrational disturbance determining means (114, S28, S30) for determining that the vibration which has occurred on the vehicle is a vibrational disturbance when the counted number exceeds a reference value.

It should be noted that in the foregoing embodiments that the determination of the threshold values is not limited to the description. The threshold can instead be other numbers or a range.

It should also be noted that, although the foregoing description was made with respect to the case of using a continuously variable transmission of the metal belt type, the invention can also be effectively applied to one of the rubber belt type or toroidal type.

It should further be noted that the start clutch should not be limited to the hydraulic clutch and may instead by an electromagnetic clutch.

It should further be noted that although the description has been made on the transmission having a dual-mass fly wheel 26, the invention can be applied to a transmission without a dual-mass fly wheel.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a frictional engaging clutch installed in a transmission which transmits output torque generated by an internal combustion engine mounted on a vehicle to wheels of the vehicle, including:

judder discriminating means for discriminating whether a vibration which has occurred on the vehicle is a judder; and judder-decreasing control means for acting to decrease the judder when the judder discriminating means discriminates that the vibration which has occurred on the vehicle is a judder;

wherein the improvement comprising:

the judder discriminating means includes:

frictional engaging clutch rotational speed fluctuation detecting means for detecting an output rotational speed fluctuation of the frictional engaging clutch;

first filter means for transmitting a first range of frequency component of the detected output rotational speed fluctuation of the frictional engaging clutch;

first threshold setting means for setting a first threshold;

first counting means for comparing the first range of frequency component (filtered) with the first threshold to count the number of times (NTEX) at which the first range of frequency component exceeds the first threshold; and judder determining means for determining that the vibration which has occurred on the vehicle is a judder when the counted number exceeds a reference value.

2. A system according to claim 1, wherein said judder discriminating means further including:

second filter means for transmitting a second range of frequency component of the detected output rotational speed fluctuation of the frictional engaging clutch;

second threshold setting means for setting a second threshold;

second counting means for comparing the second range of frequency component (filtered) with the second threshold to count the number of times (NTEX) at which the second range of frequency component exceeds the second threshold; and vibrational disturbance determining means for determining that the vibration which has occurred on the vehicle is a vibrational disturbance when the counted number exceeds a reference value.

3. A system according to claim 1, wherein the judder-decreasing control means acts to decrease the judder by retarding an ignition timing to be supplied to the engine.

4. A system according to claim 2, wherein the judder-decreasing control means acts to decrease the judder by retarding an ignition timing to be supplied to the engine.

5. A system according to claim 1, wherein the judder-decreasing control means acts to decrease the judder by increasing an engaging force of the frictional engaging clutch.

6. A system according to claim 2, wherein the judder-decreasing control means acts to decrease the judder by increasing an engaging force of the frictional engaging clutch.

7. A system according to claim 1, wherein the judder-decreasing control means acts to decrease the judder for a predetermined period.

8. A system according to claim 3 wherein the judder-decreasing control means acts to decrease the judder for a predetermined period.

9. A system according to claim 5, wherein the judder-decreasing control means acts to decrease the judder for a predetermined period.

10. A system according to claim 1, wherein the judder discriminating means further including:

vehicle condition determining means for determining whether the vehicle condition is under a specific condition;

and discriminates that a vibration which has occurred on the vehicle is a judder, when the vehicle is under the specific condition.

11. A system according to claim 3, wherein the judder discriminating means further including:

vehicle condition determining means for determining whether the vehicle condition is under a specific condition;

and discriminates that a vibration which has occurred on the vehicle is a judder, when the vehicle is under the specific condition.

12. A system according to claim 5, wherein the judder discriminating means further including:

vehicle condition determining means for determining whether the vehicle condition is under a specific condition;

and discriminates that a vibration which has occurred on the vehicle is a judder, when the vehicle is under the specific condition.

13. A system according to claim 10, wherein the specific condition is that the vehicle is being started to run.

14. A system according to claim 1, wherein the frictional engaging clutch rotational speed fluctuation detecting means detects the output rotational speed fluctuation of the frictional engaging clutch from a ratio between rotational speeds input to and output from the frictional engaging clutch.

15. A system according to claim 3, wherein the frictional engaging clutch rotational speed fluctuation detecting means detects the output rotational speed fluctuation of the frictional engaging clutch from a ratio between rotational speeds input to and output from the frictional engaging clutch.

16. A system according to claim 5, wherein the frictional engaging clutch rotational speed fluctuation detecting means detects the output rotational speed fluctuation of the frictional engaging clutch from a ratio between rotational speeds input to and output from the frictional engaging clutch.

17. A system according to claim 1, wherein the frictional engaging clutch rotational speed fluctuation detecting means detects the output rotational speed fluctuation of the frictional engaging clutch in a dc waveform and includes;

means for converting the dc waveform into an ac wave such that the ac waveform is input to at least the first filter means.

18. A system according to claim 3, wherein the frictional engaging clutch rotational speed fluctuation detecting means detects the output rotational speed fluctuation of the frictional engaging clutch in a dc waveform and includes;

means for converting the dc waveform into an ac wave such that the ac waveform is input to at least the first filter means.

19. A system according to claim 5, wherein the frictional engaging clutch rotational speed fluctuation detecting means detects the output rotational speed fluctuation of the frictional engaging clutch in a dc waveform and includes;

means for converting the dc waveform into an ac wave such that the ac waveform is input to at least the first filter means.

* * * * *